United States Patent [19]

Boyle et al.

[11] Patent Number: 4,596,753
[45] Date of Patent: Jun. 24, 1986

[54] SPIN RELEASED RESERVOIR FOR ELECTROCHEMICAL CELLS AND LIKE ARTICLES

[75] Inventors: Gerard H. Boyle, Concord; Stephen S. Corda, Holliston, both of Mass.

[73] Assignee: GTE Government Systems Corporation, Waltham, Mass.

[21] Appl. No.: 726,758

[22] Filed: Apr. 24, 1985

[51] Int. Cl.[4] .............................................. H01M 6/36
[52] U.S. Cl. ...................................... 429/114; 429/116
[58] Field of Search ........................ 429/113, 114, 116; 102/231, 232, 234–240, 244, 245

[56] References Cited

U.S. PATENT DOCUMENTS

| | | | |
|---|---|---|---|
| 2,232,690 | 2/1941 | Church et al. | 102/238 |
| 2,656,401 | 10/1953 | Everett | 429/114 |
| 2,918,515 | 12/1959 | Lawson | 136/90 |
| 3,432,359 | 3/1969 | Cleveland et al. | 429/114 |
| 3,647,555 | 3/1972 | Daniel | 136/162 |
| 3,748,183 | 7/1973 | Zaleski | 429/116 |
| 4,020,248 | 4/1977 | Goebel | 429/164 |
| 4,048,047 | 9/1977 | Beck et al. | 204/270 |
| 4,087,594 | 5/1978 | Marincic et al. | 429/90 |
| 4,284,691 | 8/1981 | Goebel et al. | 429/105 |
| 4,376,811 | 3/1983 | Goebel | 429/101 |

FOREIGN PATENT DOCUMENTS

| | | | |
|---|---|---|---|
| 239876 | 10/1925 | United Kingdom | 102/237 |
| 823771 | 11/1959 | United Kingdom | 102/238 |

Primary Examiner—Brian E. Hearn
Assistant Examiner—Stephen J. Kalafut
Attorney, Agent, or Firm—J. Stephen Yeo

[57] ABSTRACT

A reserve type electrochemical cell has its liquid cell component left separate in a rupturable envelope separate from the battery stack. The envelope is located within a sleeve in a well at the center of the battery stack. Piercing means are arranged in recesses along the side of the sleeve. If the cell is spun about its axis, the liquid cell component forces the part of the envelope into the recesses where it is ruptured, thereby discharging the liquid cell component into the battery stack.

2 Claims, 6 Drawing Figures

SPIN RELEASED RESERVOIR FOR ELECTROCHEMICAL CELLS AND LIKE ARTICLES

This application pertains to reserve type electrochemical cells, and more particularly, is concerned with means for storing and releasing a liquid component within such cells.

Electrochemical cells have limited shelf life and they may be subject to chemical reactions within the cell. Some applications require a cell to be stored for an extended period and yet be readily activated when needed. For these applications, reserve cells are used. Reserve cells keep a liquid cell component, e.g., electrolyte, of the cell in a reservoir, separate from the other cell components until activation. The liquid cell component is then released to energize the cell.

The reservoir itself must be corrosive resistant and strong, yet reliably release its contents upon activation. A number of arrangements have been devised to meet these needs.

Daniel in U.S. Pat. No. 3,647,555 describes a storage battery in which a plastic bag contains electrolyte. When water is added, the bag floats and is ripped open by a tear strip. Daniel refers to an arrangement in which a electrolyte containing plastic bag is punctured.

Mariniu in U.S. Pat. No. 4,087,594 describe a polytetrafluoroethylene ampule arranged to be pierced by a rod-like member to release contained electrolyte.

Some cells, such as described by Lawson in U.S. Pat. No. 2,918,515 have an electrolyte containing ampule located within a well. The ampule is broken by a point upon acceleration of the cell.

These arrangements generally perform adequately for their intended use, however, it is possible for at least some of the reservoirs known to the prior art to rupture prematurely when exposed to severe shock or vibration. Cost and simplicity are also factors.

Accordingly, it is an object of the invention to provide a reservoir for reserve-type electrochemical cells which is safe from premature rupture yet will reliably release its contents when desired.

DETAILED DESCRIPTION OF THE INVENTION

Figure 1:
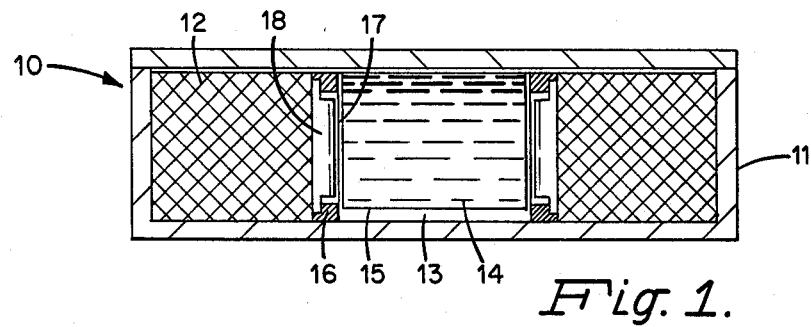
FIG. 1 is a cross-sectional side view of a cell embodying the invention.
Figure 2:
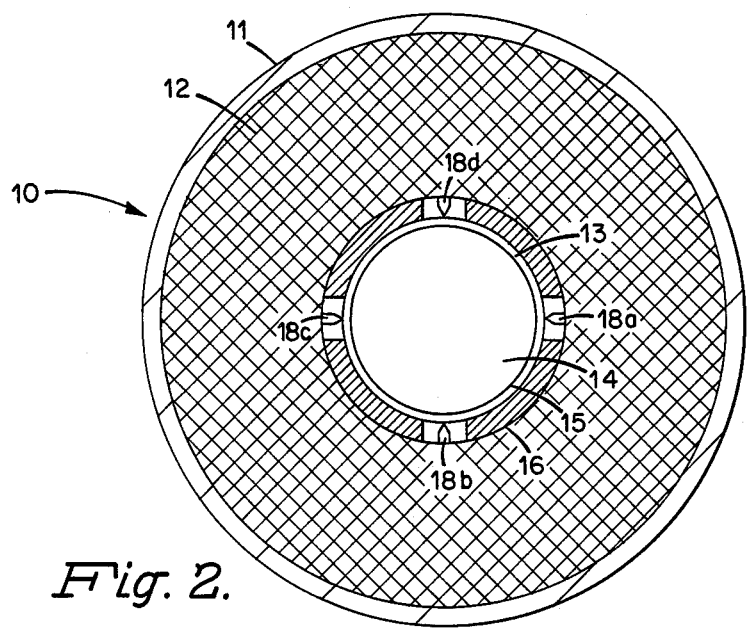
FIG. 2 is a cross-sectional top view of the cell of FIG. 1.

Referring first to both FIGS. 1 and 2, there are seen cross-section views of a reserve type electrochemical cell 10 which embodies an aspect of the invention. The cell 10 is generally cylindrical and is intended to be activated when it is spun on its axis.

The cell 10 has a cylindrical housing 11 containing a cylindrical battery stack 12 and a central cylindrical coaxial well 13. A battery stack is an arrangement of solid electrode structures. The particular construction and chemistry of the battery stack 12 is not the subject of this invention. The major constraints are that the cell have a liquid component which can be kept separate from the battery stack until activation is desired; the battery stack should be generally cylindrical to balance the cell about its axis; and the battery stack should have a generally cylindrical well at its core. The well provides storage space for the liquid cell component. The cell is not activated until the liquid cell component contacts the battery stack.

The battery stack may consist of bipolar plates such as described in U.S. Pat. No. 4,048,047.

Among other possible battery stacks are alternating electrode structures such as described in U.S. Pat. No. 4,284,691; cylindrical electrode structures such as described in U.S. Pat. No. 4,376,811; and spiral wound electrode structures such as described in U.S. Pat. No. 4,020,248.

Electrical connections to the battery stack and other assembly details of a general nature are given in these patents.

As a feature of the invention, the liquid cell component 14 is stored in a sealed envelope 15 made of a flexible liquid impervious membrane. The membrane may be coated or flashed with metal to reduce liquid or vapor transmission through the membrane. The envelope 15 is preferably cylindrical and fits within the well 13. A sleeve 16 functions as the side of well 13. At least one recess 17 is provided in the side of the sleeve 16. Within the recess 17, a piercing member 18 such as a lance or blade for opening the envelope is mounted. The point of the piercing member 18 faces the envelope but is below the surface of sleeve 16.

Figure 3:
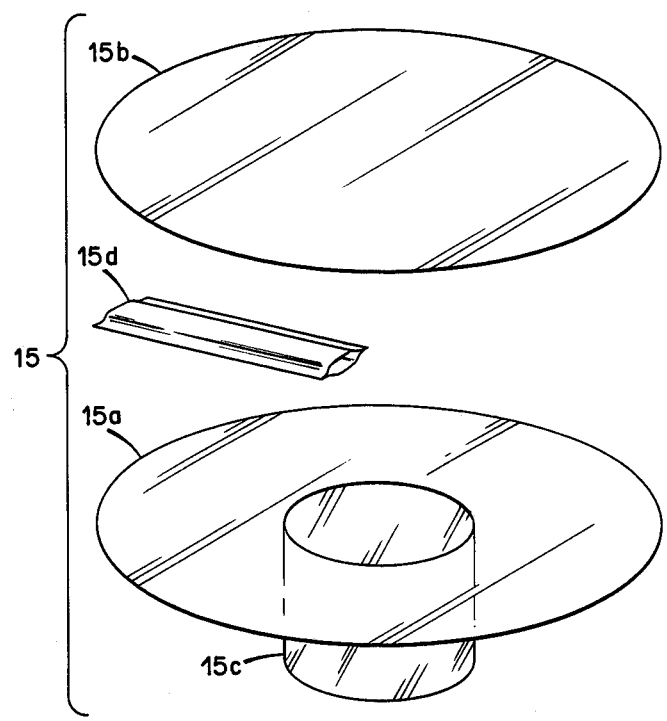
FIG. 3 is an exploded view of the components of a liquid cell component containing envelope used in the cell.
Figure 4:
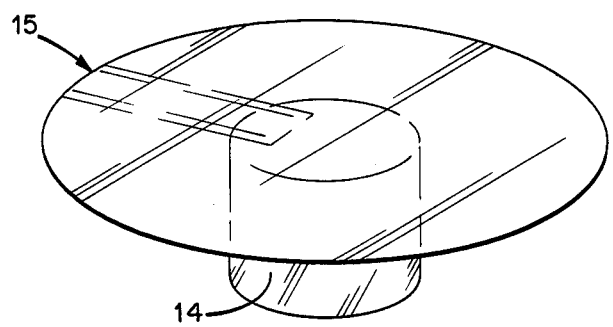
FIG. 4 illustrates the assembled liquid cell component containment envelope.

FIG. 3 illustrates the preferred construction of the envelope 15. Two sheets 15a, 15b of a flexible liquid impervious membrane such as polytetrafluoroethylene are used. A cylindrical pouch 15c is formed in the otherwise flat first sheet 15a. A flat second sheet 15b is heat sealed or otherwise bonded to the first sheet 15a covering pouch 15c. A simple flapper valve 15d of the same material as the sheets may be interposed between the sheets as shown. The envelope 15 can then be filled through a tube inserted in the valve 15d. The valve is then sealed shut. Alternately, the pouch may be filled with the liquid cell component before the second sheet is bonded in which case the valve is not needed. The flat portion joining the sheets may be used to suspend the envelope in the well. FIG. 4 shows assembled envelope 15 containing liquid cell component 14.

Figure 5:
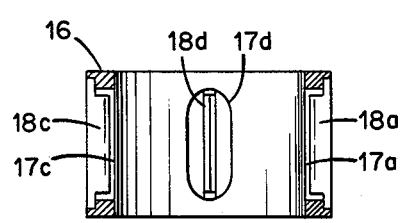
FIG. 5 shows a cross-sectional side view of a sleeve and piercing member assembly which opens the envelope during activation of the cell.
Figure 6:
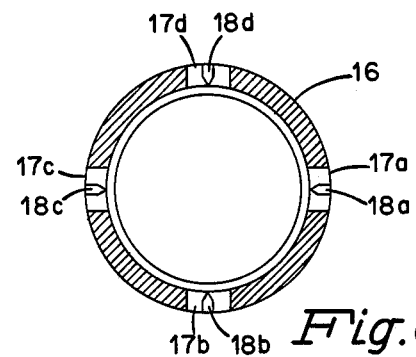
FIG. 6 shows a cross-sectional top view of the sleeve and piercing member assembly.

FIGS. 5 and 6 show cross-sectional views of sleeve 16 for insertion into the well defined by the battery stack. As mentioned, sleeve 16 functions as the side of the well. Recess 17 is provided on the side of the sleeve. A piercing member 18 such as a lance or blade is arranged in the recess below the inner surface of the sleeve 16.

Preferably, the sleeve 16 has a plurality of recesses 17a, 17b, 17c, 17d and piercing means 18a, 18b, 18c, 18d to allow uniform dispersion of liquid cell 14.

As best visualized by FIG. 1, the envelope 15 is suspended within the well 13. The piercing member 18 is below the inner surface of the sleeve 16. When the cell is spun about its its axis, the liquid cell component 14 within the envelope 15 forces the flexible membrane of the envelope into the recesses 17 where the piercing member 18 ruptures the envelope. The liquid cell component 14 then flows out of the ruptured envelope 15 into the battery stack 12, thereby activating the cell. Since the piercing member 18 is below the inner surface of the sleeve 16 it is unlikely the envelope 15 will be inadvertently ruptured by shock or vibration.

Various modifications to the invention will be apparent to those skilled in the art. Therefore, the scope of the invention is defined by the claims and not the specific examples given in the description.

I claim:

1. A reserve cell activated by spinning comprised of
   a cylindrical battery stack having a central well;
   a recess within the side of said well;
   piercing means arranged within said recess;
   an envelope of flexible liquid impervious membrane arranged within said well; and
   a liquid cell component contained within said envelope;
   whereupon spinning the cell about its axis causes part of said envelope to be forced into said recess where said envelope is ruptured by said piercing means, thereby releasing said liquid cell component from said envelope.

2. The reserve cell of claim 1 which further includes:
   a sleeve lining said well, said recesses and piercing means located in said sleeve.

* * * * *